United States Patent
Khu

(10) Patent No.: US 7,185,330 B1
(45) Date of Patent: Feb. 27, 2007

(54) CODE OPTIMIZATION METHOD AND SYSTEM

(75) Inventor: Arthur H. Khu, San Mateo, CA (US)

(73) Assignee: Xilinx, Inc., San Jose, CA (US)

( * ) Notice: Subject to any disclaimer, the term of this patent is extended or adjusted under 35 U.S.C. 154(b) by 591 days.

(21) Appl. No.: 09/755,502

(22) Filed: Jan. 5, 2001

(51) Int. Cl.
*G06F 9/45* (2006.01)

(52) U.S. Cl. ............ 717/160; 717/152; 717/154

(58) Field of Classification Search ......... 717/131, 717/7, 136, 9, 150, 155, 158, 160; 397/705; 395/709, 705
See application file for complete search history.

(56) References Cited

U.S. PATENT DOCUMENTS

| | | | | |
|---|---|---|---|---|
| 4,833,606 A | * | 5/1989 | Iwasawa et al. | 717/160 |
| 5,606,698 A | * | 2/1997 | Powell | 717/161 |
| 5,835,771 A | * | 11/1998 | Veldhuizen | 717/154 |
| 6,074,433 A | * | 6/2000 | Haraguchi et al. | 717/160 |
| 2002/0087954 A1 | * | 7/2002 | Wang et al. | |

OTHER PUBLICATIONS

Cooper, Keith D. and Nathaniel McIntosh, "Enhanced Code Compression for Embedded RISC Processors," ACM Press, Proceedings of the ACM SIGPLAN 1999 Conference on Programming Language Design and Implementation, pp. 139-149.*
Microsoft Press Computer Dictionary, third edition, Microsoft Press, 1997.*

* cited by examiner

*Primary Examiner*—Tuan Dam
*Assistant Examiner*—Michael Yigdall
(74) *Attorney, Agent, or Firm*—Ned Pejic; LeRoy D. Maunu

(57) ABSTRACT

A method and system for optimizing computer source code is provided. Prior to compiling the source code, the code is analyzed to determine the occurrence of repeating patterns of code. The repeating patterns of code are replaced with a programming loop that executes a single instance of the pattern multiple times using appropriate array indices and loop increments. In this manner, source code size is reduced making transfer, storage and compiling more efficient.

17 Claims, 2 Drawing Sheets

CODE OPTIMIZATION METHOD AND SYSTEM

FIELD OF THE INVENTION

The invention relates generally to software code optimization and, more particularly, to a method of optimization that reduces the number of program instructions by replacing repeating patterns of code with a programming loop. It will be appreciated that the invention finds particular application to programming languages that are used to program or test programmable logic devices but also applies to any type of programming language.

BACKGROUND OF THE INVENTION

A programmable logic device (PLD) is a digital integrated circuit capable of being programmed to provide a variety of different logic functions. A PLD generally includes AND gates, OR gates, and Input/Output buffers, and functions differently depending on how it is programmed. The programming is achieved using on-chip fuses, EPROM (UV erasable programmable read-only memory) circuits, EEPROM (electrically erasable programmable read-only memory) circuits, and RAM (random access memory) circuits which programmably create data paths and logic functions within the device that are specific to the user's design.

State of the Art PLDs make use of one or more non-volatile memory cell (e.g. EPROM, EEPROM, Flash EPROM, or Flash EEPROM) arrays so that they can retain their configuration memory during power-down. Typically, these arrays are erasable, thereby allowing the desired functionality of the PLD to be re-programmed many times. This programmability makes a PLD family a flexible and powerful tool for a large number of unique applications where a common PLD is employed and only the chip's internal programming is varied.

Typically, verification is required after programming to ensure that the memory cells have been properly programmed and that the PLD functions according to the design specification. Verification of a PLD involves a combination of in-circuit functional testing, simulation, timing analysis, and memory cell verification. Memory cell verification is especially important in that it determines whether the PLD has been programmed correctly according to the design specification, and thus must be performed before shipping to a user or using the device for an actual application.

In integrated circuit testing, a technique called "boundary scan" has been developed to define a standard test logic architecture for implementing boundary scan functions which can be included in an integrated circuit for the purpose of testing the integrated circuit. This standard architecture was approved on Feb. 15, 1990 by the Institute of Electrical and Electronics Engineers (IEEE) and is commonly referred to as JTAG (Joint Test Action Group) or IEEE Standard 1149.1.

Originally, the JTAG standard created a means of verifying the integrity of traces between components on an assembled printed circuit board. This was accomplished by providing a standard architecture and a set of mandatory public instructions that all vendors claiming conformance to IEEE standard 1149.1 had to support.

Test programs can be written in accordance with the JTAG standard to program, pattern verify and functionally verify a programmable logic device. These programs can become large and can require large amounts of computer resources to store and execute. Prior art methods that attempted to optimize program code included using control-flow analysis on conditional statements such as IF-THEN and GOTO statements found in the source code or intermediate code to look for loops. Then the process attempted to create a FOR or WHILE loop by analyzing the beginning and end data conditions in the code to determine the loop index.

The prior art optimization methods provide no benefit to program source code that does not have conditional statements. Thus, if the code did not have IF-THEN statements, a loop could not be deduced and no optimization was performed.

SUMMARY OF THE INVENTION

According to one embodiment of the present invention, a method for optimizing computer program code is provided. A keyword statement is identified and the program code is searched for the keyword statement. It is then determined if the keyword statement begins a repeating pattern of statements in the program code. The repeating pattern of statements is replaced with a program loop equivalent to the repeating pattern of statements.

According to another embodiment of the present invention, a software code optimizer is provided. The optimizer includes program instructions that analyze a software code and determine an occurrence of a repeating pattern of code therein. The optimizer also includes program instructions that convert the repeating pattern of code to a programming loop that performs an equivalent function as the repeating pattern of code.

According to yet another embodiment of the present invention, a process for optimizing software code is provided. The process locates multiple occurrences of a code pattern within the software code where the multiple occurrences appear sequentially to each other. A program loop is generated that executes one occurrence of the code pattern N times such that an equivalent result is produced as executing the multiple occurrences of the code pattern. The multiple occurrences of the code pattern are then replaced in the software code with the program loop.

One advantage of the present invention is that program code is reduced in size by replacing multiple lines of repeating code with fewer lines of a program loop code.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF THE DRAWINGS

Figure 1:
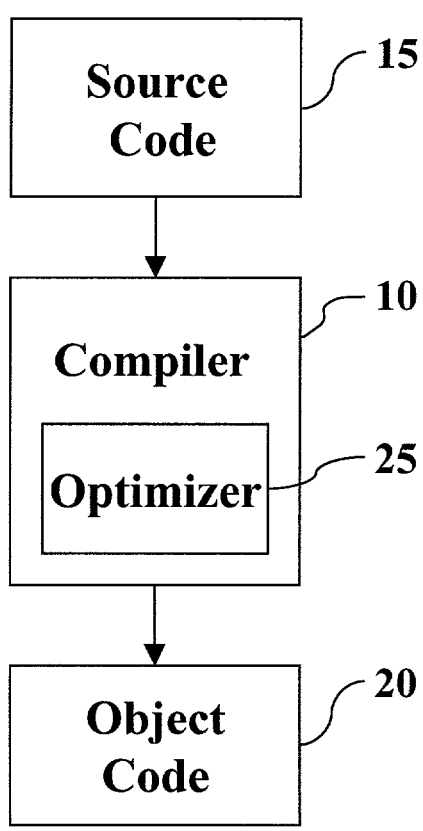
FIG. 1 is an overall system in accordance with the present invention.

Illustrated in FIG. 1 is an overall embodiment of the present invention. A compiler 10 is a computer program that translates a source code 15 into object code 20 that is executable by a computer. The source code 15 is a computer program written in a programming language by a programmer, automatically generated by a computer or software application, or some combination of both. The compiler 10 converts the source code 15 into assembly language and then translates the assembly language into machine language which is called the object code 20. It will be appreciated by one of ordinary skill in the art that other conversion formats and conversion steps are available depending on the programming language used. For example, the source code may be written directly as assembly language or other low-level language as is known in the art, thus, eliminating the step of converting the source code to assembly language. For purposes of the foregoing discussion, the terms "instruction" and "statement" will be used interchangeably to refer to a line of program code.

To optimize the translation process, the compiler 10 includes an optimizer 25 that analyzes the source code 15 to identify repetitive patterns of program instructions. The optimizer 25 is a function or routine of program instructions within the compiler 10. Alternately, it can be a stand-alone software application that is executable separate from the compiler 10. The optimizer 25 replaces repeating patterns of instructions with a programming loop that executes one instance of the repeating pattern multiple times. Using data arrays and appropriate loop indices, the programming loop is equivalent to the repeating pattern of instructions but requires a fewer number of instructions. Thus, after being optimized, the source code is reduced in size. Reducing the program size makes code more efficient to transfer, store and/or compile, and may enhance code performance in certain systems because of reduced memory requirements (e.g., fewer cache misses and/or page faults).

Figure 2:
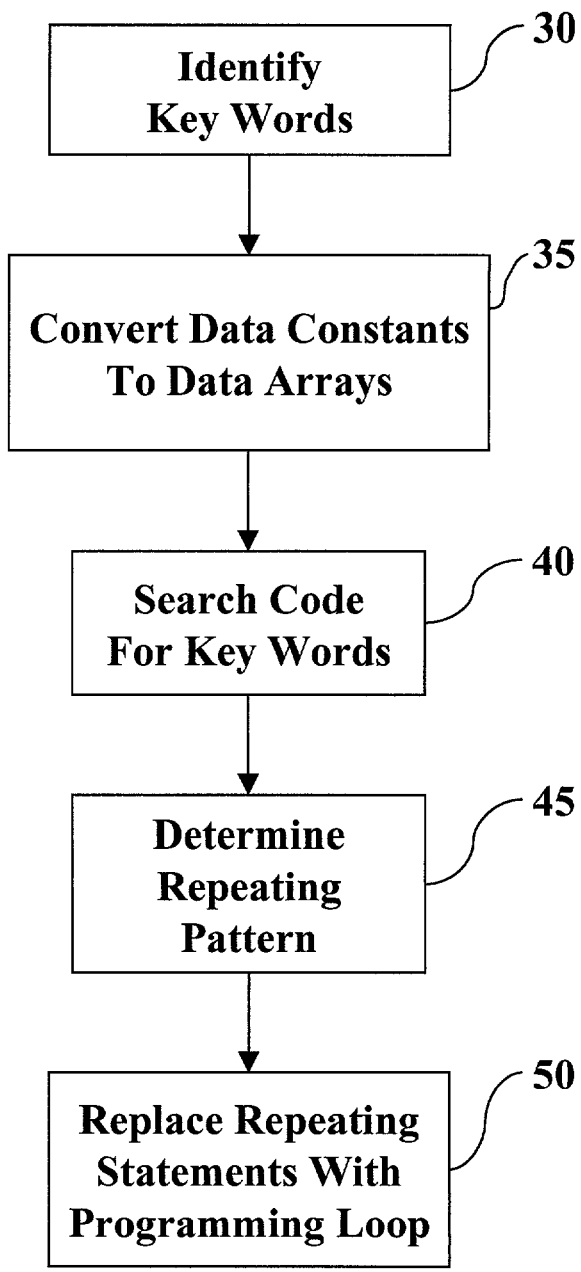
FIG. 2 is a flow chart for optimizing source code in accordance with the present invention.

Illustrated in FIG. 2 is a flow diagram of the methodology of the optimizer 25 where the blocks represent actions or events performed therein. With reference to Table 1 below, an exemplary set of computer instructions from a source code is shown. In the example, the instructions are written in the STAPL tester language which is JEDEC standard JESD71. STAPL code is used by engineers to program and test integrated chips such as programmable logic chips. To simplify the explanation, only three instructions are shown including "IRSCAN" (instruction register scan), "DRSCAN" (data register scan), and "IF-THEN" (conditional statement). Due to the large number of programming languages known in the computer arts, it will be appreciated that the invention can be applied to any programming language and any programming instructions.

With further reference to Table 1, a description of the DRSCAN instruction will be provided. Referring to line number 2 of Table 1, the DRSCAN instruction is an instruction to shift 32-bits consisting of ones "1" (represented as hexadecimal FFFFFFFF). The data read back is compared with the 32-bit hexadecimal value 09502093 masked by 0FFFFFFF. If the 32-bit data does not match, then set the "X" variable to "0". The symbol "$" identifies a data reference value represented in hexadecimal form. Here, the data references are data constants but it will be appreciated that in other languages, data variables may be used.

With further reference to FIG. 2 shown at block 30, the optimizer 25 identifies one or more keywords that will be the target for optimization within the source code 15. The keyword can be predetermined within the optimizer or selected by a user on the fly. A keyword candidate is generally a source code instruction that frequently is repeated and may contain data constants. For exemplary purposes, the instruction statement "DRSCAN" is selected as the keyword.

At block 35, each instance of the keyword is found within the source code and its data constants, if present, are converted to data array references. By converting data constants to data arrays, repeating patterns become more apparent within the code and thus easier to identify. After the conversion at block 35, the source code will, for example, look like the code shown in Table 2 below. As seen in line 2, the DRSCAN statement now includes data array references dTDI, dTDO, and DMASK. It is noted that the data array references have been arbitrarily named for the present discussion and any name can be selected.

The data array references are assigned 32 array indices "0–31", shown as [31 . . . 0], to correspond to the 32-bit data constants of the original DRSCAN instruction. A similar conversion also occurs in the remaining DRSCAN statements with the only difference being that the array indices are successively incremented to store each new data constant at the next available array index values. In other words, the next available index value for the array dTDI is "32." So, the DRSCAN instruction at line 6 (a 6-bit instruction) shows array dTDI with index values 32–37. The conversion continues until all keyword instructions in the source code are converted to include data array references. After this conversion, the similar keyword instructions will look substantially identical except for their array indices.

The data array reference dTDI is defined to include the replaced data constants from the DRSCAN instructions in sequential order corresponding to the array indices assigned during conversion. An exemplary definition is shown at the bottom of Table 2 as "BOOLEAN dTDI" and the data that follows are the data constants. It will be appreciated to one of ordinary skill in the art that the syntax for defining an array is dependent on the programming language used and, thus, will change accordingly.

With reference again to FIG. 2, after data references in keyword statements are converted to data array references, the optimizer 25 begins analysis of the source code to identify repeating patterns of statements including the keyword DRSCAN. At block 40, the source code is searched line by line for instances of the keyword statement. At each instance of the keyword, the optimizer determines whether a repeating pattern is present or not at block 45. At block 50, if a repeating pattern of statements is found, the repeating statements are replaced with a programming loop generated by the optimizer.

The programming loop is generated with instructions that perform an equivalent function as the replaced repeating statements but does so with fewer actual statements of code within the source code 15. An exemplary resulting programming loop is shown in Table 3 where repeating patterns of the DRSCAN statement have been replaced by a FOR-NEXT loop. The process of block 45 for determining a repeating pattern within the source code will now be explained with reference to FIG. 3.

Figure 3:
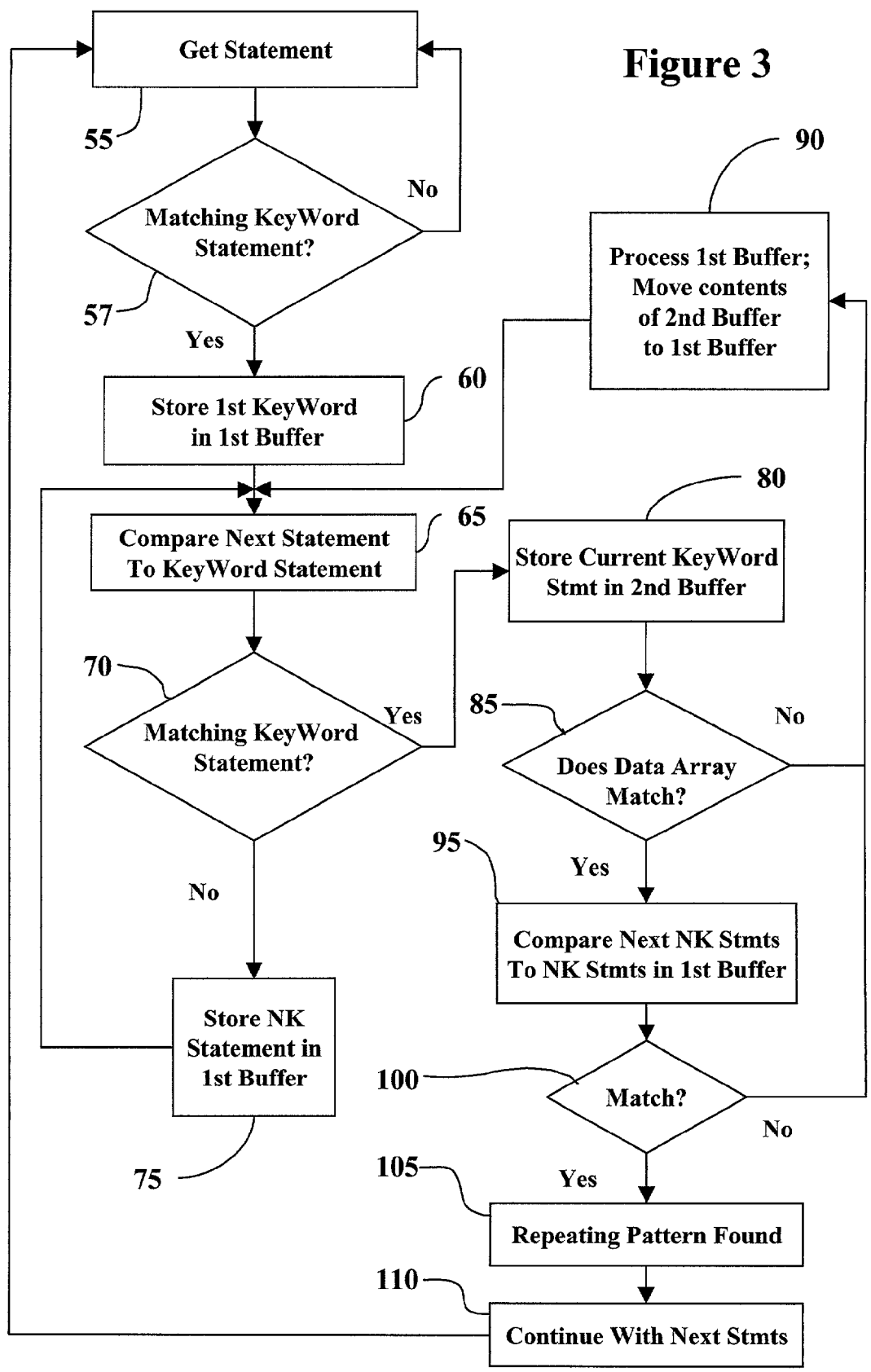
FIG. 3 is a flow diagram for determining repeating patterns of code in accordance with the present invention.

Illustrated in FIG. 3 is an exemplary flow diagram of the methodology for determining repeating patterns of statements within source code in accordance with the present invention. The blocks represent actions and/or events performed therein. The methodology will be explained with reference to the exemplary program code in Table 2. To summarize, the source code is analyzed to identify and group code statements together that may form a repeating pattern of code. Locating a keyword statement signals the beginning of a first pattern. The next located keyword statement signals the end of the first pattern and the beginning of a second pattern. Of course, each keyword statement may have zero, one or more non-keyword statements that follow it which form part of their pattern. If the first and second patterns match, a repeating pattern is found that repeats at least twice. The process continues with the next keyword statement pattern and compares it to the first pattern. If it matches, the pattern now repeats three times. The process repeats. As soon as the next keyword statement pattern does not match the previous pattern, the previous pattern is converted to a programming loop (if it repeated) and the next keyword statement becomes the beginning of the next potential repeating pattern of code.

With reference to FIG. 3 and Table 2, shown at block 55, the optimizer scans each line of code searching for the keyword statement, in this case, DRSCAN. The optimizer continues scanning statements, as represented by block 57, until the keyword is found. At block 60, when the keyword statement is found, it is stored in a first buffer or memory location. Although DRSCAN is found at lines 2, 6 and 8, the present description will begin with line 9 since this line starts a repeating pattern.

The statement at line 9 is stored in the first buffer. Since line 9 contains the keyword statement DRSCAN, it is the beginning of a pattern and the process determines whether the pattern repeats. At block 65, the next statement at line 10 is compared to the keyword statement in the first buffer. It is then determined, as shown at block 70, whether the next statement matches the keyword statement. Here, there is no match because line 10 does not contain the keyword. Thus, line 10 is a non-keyword statement ("NK" statement) and it is stored in the first buffer at block 75 along with the keyword statement as part of its pattern. Non-keyword statements can form part of a repeating pattern by following a keyword statement. In this manner, the pattern has the form of (1) a Keyword statement and (2) one or more non-keyword statements. The simplest form of a repeating pattern includes only repeating keyword statements with no non-keyword statements.

The process continues storing subsequent non-keyword statements in the first buffer until the next keyword statement is found. The next keyword signals the end of the pattern and the beginning of a new pattern. Shown at block 65, the next statement at line 11 is compared to the keyword statement. This time, there is a match at block 70 since line 11 contains the keyword DRSCAN. Line 11, indicated here as the second keyword statement for reference purposes, is stored in a second buffer as shown in block 80. Line 11 may be the beginning of a repeating pattern of the statements stored in the first buffer.

As represented by block 85, the process determines whether the remaining portion of the keyword statement at line 11 matches the first keyword statement at line 9. In other words, it is determined whether the data arrays of each statement match. If there is no match, then there is no occurrence of a repeating pattern at this portion of code. As shown by block 90, the first buffer is processed which includes converting any repeating patterns found into a loop form, and moving the statements contained in the second buffer into the first buffer. In other words, the keyword statement at line 11 and any subsequent non-keyword statements that have been stored in the second buffer are set as the new potential beginning of a repeating pattern. Going back to block 65, the process continues the analysis with the next statement of source code.

There are at least two ways in which to handle the optimization process. The first way is to keep the original source code as one file and then create a second file that is the optimized version of the original. In this case, when statements from the source code are analyzed and not modified, they are simply written to the optimized file in the order they appear in the original file. In the above example, when no match is found, the statements from the first buffer are written to the optimized file. When statements are optimized into looping code, the looping code is written to the optimized file replacing the original repeating statements. The final version of the optimized file is then the file that gets compiled.

The second way to handle optimization is to maintain only one file. When statements from the source code file are replaced with optimized code, they are replaced in the source code file directly. It will be appreciated that there are many ways to create and maintain data files that store and modify data temporarily or permanently as is known in the art.

With reference again to FIG. 3, if the data arrays match at block 85, then a second pattern is defined in the second buffer as including the second keyword statement and adding subsequent non-keyword (NK) statements to the second buffer until another keyword statement appears in the code, or until the number of added non-keyword statements equal the number of non-keyword statements in the first buffer, which ever occurs first. For the second pattern in the second buffer to match the first pattern in the first buffer, their respective non-keyword statements must match in form and in quantity, if any exist. In the example of Table 2, line 12 is added to the second pattern and then both of the above-conditions occur. Namely, the next line 13 is a keyword statement, and only one non-keyword statement is added based on the number of non-keyword statements in the first pattern (e.g. one). Of course, there can be any number of non-keyword statements that follow a keyword including zero.

As represented by block 95, the non-keyword statements of the first and second patterns are compared. If there is a match at block 100, a repeating pattern is found as shown at block 105. The process continues at block 110 by determining if there are additional instances of the repeating pattern that follow. This process repeats until a keyword statement is found that does not match the first keyword statement of the pattern or if the non-keyword statements do not match those which follow the first keyword statement. When such a non-match is found, shown at block 90, the pattern of statements in the first buffer are converted to loop form if they were found to repeat, the first buffer is reset, and the statements in the second buffer are moved to the first buffer, and the process continues.

With further reference to Table 2, the methodology of determining a data array match shown at block 85 will be described. When comparing keyword statements at line 9 and line 11, each statement has the same data array references, namely, dTDI, dTDO and dMASK. However, the array indices do not match identically. This condition does not eliminate the possibility of a match. Rather, it is determined whether the size of the data arrays match and whether the difference in index values match. In other words, if the number of index values within each data array reference is identical in both keyword statements and if the index values are sequential to each other, the keyword statements match.

Looking to the keyword statement at line 9, the data array reference dTDI has index values 65 to 91 which is a size of 27 index values. Looking to the keyword statement at line 11, data array reference dTDI has index values 92 to 118 which is a size of 27 index values. Since both data array references have the same number of index values, the data arrays match in size. The same comparison is then performed for the other data array references for each keyword statement.

Then it is determined if the data array index values are sequential to each other. This is performed by, for example, finding the difference between the first and last index values from the two data arrays. Comparing the dTDI array of line 9 and the dTDI array of line 11, the difference between the first index values is 118−91=27. The difference between the last index values is 92−65=27. Since the differences are equal, it indicates that the index values of the two dTDI arrays are sequential and, thus, qualify for a repeating pattern. Of course, determining if indices are sequential will depend on the programming language being analyzed and its syntax for arrays.

With reference again to Table 2, by continuing the analysis of the program code, the pattern defined by the DRSCAN/IF-THEN statements of lines 9 and 10 is found to repeat six (6) times from line 9 to line 20 of the program code. This repeating pattern of code is then optimized by converting it to a loop statement/instruction including an appropriate loop instruction and one instance of the repeating pattern. The loop is set to execute the pattern the same number of times that the pattern was found in the program code. In this example, the number is six (6). The data array index values in the pattern are modified so that each iteration of the loop addresses the next sequence of data array index values. An exemplary programming loop is shown in Table 3 at lines 9–12. This loop, thus, replaces the repeating pattern of code and reduces the size of the program code.

With reference to Table 3, an exemplary FOR-NEXT loop is used as the replacement code. A loop variable iVar is defined from 0 to 5 so that the loop iterates six (6) times which is the number of instances of the repeating pattern found. The DRSCAN statement is modified to include the loop variable iVar in its array index so that each iteration of the FOR-NEXT loop references the next sequential DRSCAN data values from the original program code. In this case, the loop variable iVar is multiplied by 27 which is the number of index values in each data array reference. It is also seen that the number 91 and 65 are added to the index variables. These numbers represent the first and last index values from the first instance of the repeating pattern found at line 9 of the original program code. Similar index values are also used for the remaining data array references. The remaining non-keyword statements in the pattern, in this case the IF-THEN statement, follow the keyword statement in the FOR-NEXT loop.

It will be appreciated by one of ordinary skill in the art that the array index variables will depend on the data array structure and index value range found in the repeating pattern. Also, the programming loop syntax will depend on the source code language used and the desired technique to performing the loop. Depending on the type of loop and technique, the data array index values will change accordingly as will be easily determined by one of ordinary skill. Exemplary types of loops or looping instructions that may be used with the present process but not limited thereto include FOR loops, WHILE loops, DO loops, and loops controlled by branching statements like GOTO, JUMP, BRANCH, etc.

With the present invention, source code can be reduced in size by replacing repeating patterns of statements with equivalent program loop code. Compiling time may be reduced and more efficient object code can be generated.

To further optimize the source code, the process of the present invention can be applied multiple times. In this manner, a different keyword statement is selected and the analysis is performed again. The process can also be performed to optimize the "optimized" code. To perform this optimization, the analysis targets the looping instruction to determine repeating patterns that may have been generated from a previous optimization.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the present invention can apply to any type of source code or programming language instead of the exemplary program language shown above. Additionally, the optimization process can use more than one keyword when searching for repeating patterns of code. Therefore, the invention, in its broader aspects, is not limited to the specific details, the representative apparatus, and illustrative examples shown and described. Accordingly, departures may be made from such details without departing from the spirit or scope of the applicant's general inventive concept.

TABLE 1

Sample Source Code

1. IRSCAN 8, $FE; ←Instruction Register SCAN 8 bits of data (hex FE)
2. DRSCAN 32, $FFFFFFFF,COMPARE $09502093,$0FFFFFFF,X;
3. IF (!X) THEN GOTO FAILURE;
4. IRSCAN 8, $FF;
5. IRSCAN 8, $E8;
6. DRSCAN 6, $07; ← Data Register SCAN 6 bits of data (hex 07)
7. IRSCAN 8, $EE;
8. DRSCAN 27, $00003FE;
9. DRSCAN 27, $00007FE,COMPARE $00003FF,$7FFFFFF,X;    ←repeating pattern
10. IF (!X) THEN GOTO FAILURE;    ←line 2 of pattern
11. DRSCAN 27, $0000BFE,COMPARE $00007FF,$7FFFFFF,X;
12. IF (!X) THEN GOTO FAILURE;
13. DRSCAN 27, $0000FFE,COMPARE $0000BFF,$7FFFFFF,X;
14. IF (!X) THEN GOTO FAILURE;
15. DRSCAN 27, $00013FE,COMPARE $0000FFF,$7FFFFFF,X;
16. IF (!X) THEN GOTO FAILURE;

TABLE 1-continued

Sample Source Code

17. DRSCAN 27, $00023FE,COMPARE $00013FF,$7FFFFFF,X;
18. IF (!X) THEN GOTO FAILURE;
19. DRSCAN 27, $00027FE,COMPARE $00023FF,$7FFFFFF,X;
20. IF (!X) THEN GOTO FAILURE;

TABLE 2

Source Code After Data Array Conversion

1. IRSCAN 8, $FE;
2. DRSCAN 32,dTDI[31...0],COMPARE dTD0[31...0],dMASK[31...0],X;
3. IF (!X) THEN GOTO FAILURE;
4. IRSCAN 8, $FF;
5. IRSCAN 8, $E8;
6. DRSCAN 6,dTDI[37...32];
7. IRSCAN 8, $EE;
8. DRSCAN 27,dTDI[64...38];
9. DRSCAN27,dTDI[91...65],COMPARE dTD0[58...32],dMASK[58...32],X;
10. IF (!X) THEN GOTO FAILURE;
11. DRSCAN27,dTDI[118...92],COMPARE dTD0[85...59],dMASK[85...59],X;
12. IF (!X) THEN GOTO FAILURE;
13. DRSCAN 27,dTDI[145...119],COMPARE dTD0[112...86],dMASK[112...86],X;
14. IF (!X) THEN GOTO FAILURE;
15. DRSCAN 27,dTDI[172...146],COMPARE dTD0[139...113],dMASK[139...113],X;
16. IF (!X) THEN GOTO FAILURE;
17. DRSCAN 27,dTDT[199...173],COMPARE dTD0[166...140],dMASK[166...140],X;
18. IF (!X) THEN GOTO FAILURE;
19. DRSCAN 27,dTDI[226...200],COMPARE dTD0[193...167],dMASK[193...167],X;
20. IF (!X) THEN GOTO FAILURE;
    BOOLEAN dTDI[68108] = $03...   ← data array definition
    ...
    91FF00113FE0021FFC0042FF80083FF00103FE
    001A7FC0033FF80065FF000C7FE00187FC002CFF80057FF000ABFE0014FFC0028
    FF80049FF0008FFE00117FC0021FF80041FF00053FE0009FFC0012FF80023FF00
    043FE00067FC000BFF80015FF00027FE00047FC0004FF80007FF0000BFE0000FF
    C0000FF87FFFFFFFF;

TABLE 3

Optimized Source Code

1. IRSCAN 8, $FE;
2. DRSCAN 32,dTDI[31...0],COMPARE dTD0[31...0],dMASK[31...0],X;
3. IF (!X) THEN GOTO FAILURE;
4. IRSCAN 8, $FF;
5. IRSCAN 8, $E8;
6. DRSCAN 6,dTDI[37...32];
7. IRSCAN 8, $EE;
8. DRSCAN 27,dTDI[64...38];
9. FOR iVar = 0 to 5;
10. DRSCAN 27, dTDI[(iVar*27)+91...(iVar*27)+65],
    COMPARE dTD0[(iVar*27)+58...(iVar*27)+32],
    dMASK[(iVar*27)+58...(iVar*27)+32],X;
11. IF (!X) THEN GOTO FAILURE;
12. NEXT iVar;

I claim:

1. A method of optimizing computer program code where the computer program code includes a plurality of statements, the method comprising the steps of:
   identifying a keyword state each, wherein the keyword statement includes a keyword and a data constant;
   sequentially locating each keyword statement in the program code;
   converting in the program code, each data constant in each keyword statement to a data array reference, wherein each data array reference includes a data array name and an array index value, and the data array names in all converted keyword statements identify a single data array;
   searching the program code for the keyword statement after the conversion of each data constant to a data array reference;
   determining, after searching the program code, if the keyword statement begins a repeating pattern of statements in the program code; and
   replacing the repeating pattern of statements with a program loop equivalent to the repeating pattern of statements.

2. The method of optimizing as set forth in claim 1 wherein the converting includes assigning an array index value to the data array reference where each located keyword statement is assigned a next sequential value of the array index value.

3. The method of optimizing as set forth in claim 2 wherein the determining step further includes:
   comparing data array references of two converted keyword statements from the program code; and
   determining if the array index values from the data array references match in size and sequential order.

4. The method of optimizing as set forth in claim 1 wherein the determining step includes:
   determining a first pattern of statements in the program code beginning with a first converted keyword statement and ending with a statement preceding a second converted keyword statement that sequentially appears in the program code after the first converted keyword statement;

determining a second pattern of statements in the program code beginning with the second converted keyword statement and ending with a statement preceding a third converted keyword statement that sequentially appears in the program code after the second converted keyword statement; and comparing the first pattern of statements to the second pattern of statements; and setting the first pattern of statements as a repeating pattern if the first and second pattern of statements substantially match.

5. The method of optimizing as set forth in claim 1 wherein the replacing step includes:

generating loop code for executing a loop within the source code at a location of the repeating pattern of statements;

inserting one instance of the repeating pattern of statements within the loop code; and defining the loop code to iterate a number of times equal to a number of instances of the repeating pattern.

6. The method of optimizing as set forth in claim 1 wherein the keyword statement is identified from a predetermined keyword statement.

7. The method of optimizing as set forth in claim 1 wherein the keyword statement is identified from a selection made by a user.

8. The method of optimizing as set forth in claim 1 further including identifying a plurality of keyword statements and repeating the method for optimizing for each of the plurality of keyword statements.

9. A process for optimizing a software code that includes a plurality of statements, the process comprising the steps of:

selecting at least one keyword statement, wherein the keyword statement includes a keyword and a data constant;

converting in the software code, each data constant of each keyword statement to a data array reference, the data array reference being loaded with values of the converted data constants, wherein each data array reference includes a data array name and an array index value, and the data array names in all converted keyword statements identify a single data array;

locating, after conversion of each data constant to an array reference, multiple occurrences of a code pattern within the software code where the multiple occurrences appear sequentially to each other in the software code;

generating a program loop that executes one occurrence of the code pattern a number of times to produce an equivalent result as executing the multiple occurrences of the code pattern; and replacing the multiple occurrences of the code pattern in the software code with the program loop.

10. The process for optimizing a software code as set forth in claim 9 further including:

selecting a keyword statement; and defining the code pattern based on the keyword statement.

11. The process for optimizing a software code as set forth in claim 10 wherein the defining step includes:

locating a first instance of the keyword statement in the software code;

defining a first code pattern to include at least the first instance of the keyword statement;

adding subsequent non-keyword statements to the first code pattern until a second instance of the keyword statement appears in the software code;

defining a second code pattern to include at least the second instance of the keyword statement;

adding subsequent non-keyword statements to the second code pattern until a third instance of the keyword statement appears in the software code or until a number of the subsequent non-keyword statements added equal a number of the subsequent non-keyword statements in the first code pattern; and comparing the first code pattern with the second code pattern to determine if the second code pattern is a multiple occurrence of the first code pattern.

12. The process for optimizing a software code as set forth in claim 9 wherein the generating a program loop step includes generating a looping instruction.

13. A method of optimizing computer program source code, wherein the computer program source code includes a plurality of statements, comprising:

searching the program source code for a keyword statement, wherein the keyword statement includes a keyword and an associated data value;

replacing in each keyword statement in the program source code, each data value with a selected array name and an associated array index specification sized to store the associated data value;

determining, after the replacing of each data value, whether the keyword statement begins a first pattern of one or more statements in the program code that is repeated in a second set of statements in the program source code; and replacing the first pattern of one or more statements and the second set of statements in the program source code with a loop control statement and at least one loop-body statement that together define a function equivalent to the first pattern and second set of statements, wherein the data value is a constant, and wherein the selected array name is the same in all keyword statements.

14. The method of claim 13, wherein the replacing step includes specifying in each array index specification a non-overlapping range of array index values.

15. The method of claim 14, wherein the specifying step includes specifying sequential ranges of array index values in array index specifications associated with keyword statements that occur sequentially in the program source code.

16. The method of claim 15, further comprising, wherein the replacing step includes generating the loop control statement and the at least one loop body statement to reference the array name and each sequential, non-overlapping range of index values.

17. An apparatus for optimizing computer program source code, wherein the computer program source code includes a plurality of statements, comprising:

means for searching the program source code for a keyword statement, wherein the keyword statement includes a keyword and an associated data value;

means for replacing in each keyword statement in the program source code, each data value with a selected array name and an associated array index specification sized to store the associated data value;

means for determining, after replacement of each data value, whether the keyword statement begins a first pattern of one or more statements in the program code that is repeated in a second set of statements in the program source code; and means for replacing the first pattern of one or more statements and the second set of statements in the program source code with a loop control statement and at least one loop-body statement that together define a function equivalent to the first pattern and second set of statements, wherein the data value is a constant, and wherein the selected array name is the same in all keyword statements.

* * * * *